(12) United States Patent
Sakurai et al.

(10) Patent No.: US 10,848,029 B2
(45) Date of Patent: Nov. 24, 2020

(54) AXIAL GAP TYPE ROTATING ELECTRIC MACHINE AND ROTATING ELECTRIC MACHINE STATOR BOBBIN

(71) Applicant: Hitachi Industrial Equipment Systems Co., Ltd., Tokyo (JP)

(72) Inventors: Jun Sakurai, Tokyo (JP); Daisaku Takahashi, Tokyo (JP); Toru Sakai, Tokyo (JP); Katsuyuki Yamazaki, Tokyo (JP); Shuuichi Takahashi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 136 days.

(21) Appl. No.: 15/759,179

(22) PCT Filed: Mar. 2, 2016

(86) PCT No.: PCT/JP2016/056321
§ 371 (c)(1),
(2) Date: Mar. 9, 2018

(87) PCT Pub. No.: WO2017/149685
PCT Pub. Date: Sep. 8, 2017

(65) Prior Publication Data
US 2018/0254680 A1  Sep. 6, 2018

(51) Int. Cl.
*H02K 3/34* (2006.01)
*H02K 21/24* (2006.01)
(Continued)

(52) U.S. Cl.
CPC .............. *H02K 3/345* (2013.01); *H02K 1/16* (2013.01); *H02K 3/12* (2013.01); *H02K 3/522* (2013.01);
(Continued)

(58) Field of Classification Search
CPC ........ H02K 3/345; H02K 3/522; H02K 21/24; H02K 15/105; H02K 3/12; H02K 1/16;
(Continued)

(56) References Cited

U.S. PATENT DOCUMENTS 6,856,061 B2 * 2/2005 Nishizawa ............. H02K 24/00
310/162
7,340,822 B2 * 3/2008 Yamamura ............. H02K 1/148
29/596

(Continued)

FOREIGN PATENT DOCUMENTS

CN    201229850 Y    4/2009
CN    102957232 A    3/2013
(Continued)

OTHER PUBLICATIONS

Extended European Search Report issued in counterpart European Application No. 16892529.5 dated Aug. 23, 2019 (eight pages).
(Continued)

*Primary Examiner* — Tulsidas C Patel
*Assistant Examiner* — Ahmed Elnakib
(74) *Attorney, Agent, or Firm* — Crowell & Moring LLP (57) ABSTRACT

The purpose of the present invention is to control the lamination thickness of the laminated core of an axial gap rotating electric machine. The axial gap rotating electric machine is provided with: a stator comprising a plurality of core members arranged circularly about the rotational axis center, said core members each comprising a columnar-laminated core having a flux surface in a rotation axis direction, a coil disposed on the outer perimeter of the core in the radial direction, and a substantially cylindrical bobbin disposed between the core and the coil; and at least one rotor facing the flux surface with a predetermined gap interposed therebetween in the rotation axis direction. The bobbin has
(Continued)

an inner cylinder facing the outer perimeter of the core in the radial direction, and at least part of the inner diameter of the inner cylinder becomes gradually smaller along the rotation axis direction and makes contact with the outer perimeter surface of the laminated core in the radial direction.

14 Claims, 10 Drawing Sheets

(51) Int. Cl.
*H02K 3/52* (2006.01)
*H02K 1/16* (2006.01)
*H02K 3/12* (2006.01)
*H02K 15/10* (2006.01)

(52) U.S. Cl.
CPC .......... *H02K 15/105* (2013.01); *H02K 21/24* (2013.01); *H02K 2203/12* (2013.01)

(58) Field of Classification Search
CPC .. H02K 2203/12; H02K 1/182; H02K 1/2793; H02K 3/34; H02K 3/487; H02K 3/493
USPC ................................. 310/179–208, 214, 215
See application file for complete search history.

(56) References Cited

U.S. PATENT DOCUMENTS

| | | | | |
|---|---|---|---|---|
| 7,930,818 | B2* | 4/2011 | Hirao | H02K 3/522 29/605 |
| 2001/0048262 | A1* | 12/2001 | Takano | H02K 1/148 310/179 |
| 2010/0148611 | A1* | 6/2010 | Wang | H02K 1/14 310/156.37 |
| 2012/0043758 | A1* | 2/2012 | Esbensen | F03D 7/0296 290/44 |
| 2012/0248930 | A1* | 10/2012 | Wang | H01F 3/04 310/254.1 |
| 2012/0313628 | A1* | 12/2012 | Van Nimmen | H02K 1/146 324/207.15 |
| 2013/0043758 | A1 | 2/2013 | Elson et al. | |
| 2014/0042859 | A1* | 2/2014 | Wang | H02K 21/24 310/156.32 |
| 2015/0288239 | A1 | 10/2015 | Yuda et al. | |
| 2017/0155290 | A1 | 6/2017 | Sakai et al. | |

FOREIGN PATENT DOCUMENTS

| | | | |
|---|---|---|---|
| CN | 103975504 A | | 8/2014 |
| CN | 104979922 A | | 10/2015 |
| CN | 106464058 A | | 2/2017 |
| JP | 55117449 | * | 9/1980 |
| JP | 2002101590 | * | 4/2002 |
| JP | 2009-124794 A | | 6/2009 |
| JP | 2013-46420 A | | 3/2013 |
| JP | 2013-121226 A | | 6/2013 |
| JP | 2013121226 | * | 6/2013 |
| JP | 6294465 B2 | | 3/2018 |
| WO | WO 2009/016196 A1 | | 2/2009 |
| WO | WO 2015/145901 A1 | | 10/2015 |

OTHER PUBLICATIONS

Korean-language Office Action issued in counterpart Korean Application No. 10-2018-7003625 dated Apr. 19, 2019 (five (5) pages).
Japanese-language Office Action issued in counterpart Japanese Application No. 2018-502931 dated Oct. 3, 2019 with English translation (12 pages).
International Search Report (PCT/ISA/210) issued in PCT Application No. PCT/JP2016/056321 dated Jun. 14, 2016 with English-language translation (two (2) pages).
Japanese-language Written Opinion (PCT/ISA/237) issued in PCT Application No. PCT/JP2016/056321 dated Jun. 14, 2016 (five (5) pages).
Chinese-language Office Action issued in counterpart Chinese Application No. 201680049119.5 dated Mar. 14, 2019 (seven pages).
Chinese-language Office Action issued in Chinese Application No. 201680049119.5 dated Jun. 18, 2020 with partial English translation (seven pages).
Korean-language Office Action issued in Korean Application No. 10-2019-7036614 dated Jul. 2, 2020 with English translation (five pages).

* cited by examiner

AXIAL GAP TYPE ROTATING ELECTRIC MACHINE AND ROTATING ELECTRIC MACHINE STATOR BOBBIN

TECHNICAL FIELD

The present invention relates to an axial gap type rotating electric machine and a rotating electric machine stator bobbin, and relates to an axial gap type rotating electric machine and a rotating electric machine stator bobbin using a laminated core as a stator.

BACKGROUND ART

There is known an axial gap type rotating electric machine in which a flux surface of a stator and a rotor is opposed to a rotating shaft direction. The axial gap type rotating electric machine is characterized in that it is possible to flatten a thickness in the rotating shaft direction compared to, for example, a radial air gap type rotating electric machine of an inner rotor type and the like, whereby it is applicable to various fields of machinery as a technique contributing to downsizing of the rotating electric machine.

The stator of the axial gap type rotating electric machine generally has a configuration including a plurality of stator core members mainly constituted of a core (e.g., iron core), an insulating member such as an insulator (bobbin), and a coil. There are various configurations such as a configuration in which one stator is obtained by disposing the plurality of independent core members, and a configuration in which a core is not independent but is a continuous body partly connected to each other, a plurality of protrusions on which the coil is applied is formed, and the insulating member and the coil are mounted thereon. As a configuration of the core as well, various configurations are known such as carving out of a metal magnetic member, a dust core, and a laminated core.

Patent Literature 1 discloses a stator core of an axial gap type rotating electric machine. Patent Literature 1 discloses a technique for obtaining the stator core by laminating a plurality of rectangular plate members having different widths.

CITATION LIST

Patent Literature

PATENT LITERATURE 1: JP-A-2013-121226

SUMMARY OF INVENTION

Technical Problem

Incidentally, in a case where the stator core is obtained by laminating the plurality of plate members or foil body pieces, deviation of plate thickness of each of the plate members or the like needs to be taken into account. In other words, a plate thickness size of each of the members is not always uniform, and in obtaining the stator core by laminating a certain number of sheets, a difference in the plate thickness size causes an individual difference in a shape of the stator core. This tendency is more likely to occur as the plate member to be laminated is thin like a foil body and as the number of sheets to be laminated is large. Since the individual difference in the shape of the stator core has a significant influence on performance and reliability, it is a problem to be avoided.

Further, from a viewpoint of securing and maintaining a space factor of the laminated core, a configuration may be used in which the laminated core is inserted into a substantially tubular bobbin made of resin and the like as the insulating member. When an external shape and a size of the laminated core are different from a shape and a size of an inner tube of the bobbin, not only the laminated core may drop off from the bobbin or the space factor may be decreased but also there is a manufacturing problem such as the plate member on an outer side contacting the inner tube during insertion of the laminated core may cause buckling or turn-up.

On the other hand, the rotating electric machine may have variations in output characteristics thereof depending on requirements of an application device to which the rotating electric machine is applied. Specifically, in a state where the core is disposed in the bobbin, a lamination thickness (space factor) may be differed between one end portion in a shaft direction of the core and the other end portion therein thereof.

A technique for enabling an improvement of workability and productivity in inserting the laminated core, securing of reliability, and flexible handling of a change in the lamination thickness of the core is desired.

Solution to Problem

In order to solve the above problem, for example, the configurations described in claims are applied. That is, an axial gap rotating electric machine includes a stator having a plurality of core members circularly disposed around a rotating shaft center, the plurality of core members including: a laminated core having a columnar shape having a flux surface in a rotating shaft direction; a coil disposed on an outer periphery in a radial direction of the core; and a bobbin having a substantially tubular shape and disposed between the core and the coil, and at least one rotor facing the flux surface interposing a predetermined gap in the rotating shaft direction. The bobbin includes an inner tube facing the outer periphery in the radial direction of the core, in which at least part of an inner diameter of the inner tube gradually becomes smaller along the rotating shaft direction and comes into contact with an outer periphery surface in the radial direction of the laminated core.

As another configuration, an axial gap rotating electric machine includes a stator having a plurality of core members circularly disposed around a rotating shaft center, the plurality of core members including: a laminated core having a columnar shape having a flux surface in a rotating shaft direction; a coil disposed on an outer periphery in a radial direction of the core; and a bobbin having a substantially tubular shape disposed between the core and the coil, and at least one rotor facing the flux surface interposing a predetermined gap in the rotating shaft direction. The bobbin includes an inner tube facing the outer periphery in the radial direction of the core, and a part of the inner tube has a tapered shape along the rotating shaft direction.

Further, as another configuration, a rotating electric machine stator bobbin includes an inner tube facing an outer periphery in a radial direction of a core constituted by laminating a laminated member of a magnetic material and has a columnar shape in which top and bottom surfaces are sections in a lamination direction. At least part of an inner diameter of the inner tube gradually becomes smaller along the rotating shaft direction and comes into contact with the outer periphery surface in the radial direction of the laminated core.

Advantageous Effects of Invention

According to the present invention, the workability, the productivity, and the reliability are improved relative to a lamination thickness deviation of the laminated core constituted of a laminated body, and further, it is possible to flexibly handle a lamination thickness control of the laminated core.

Other problems, configurations, and effects of the present invention are clarified in descriptions below.

DESCRIPTION OF EMBODIMENTS

Hereinafter, embodiments for carrying out the present invention are described with reference to the drawings.

First Embodiment

Figure 1A:
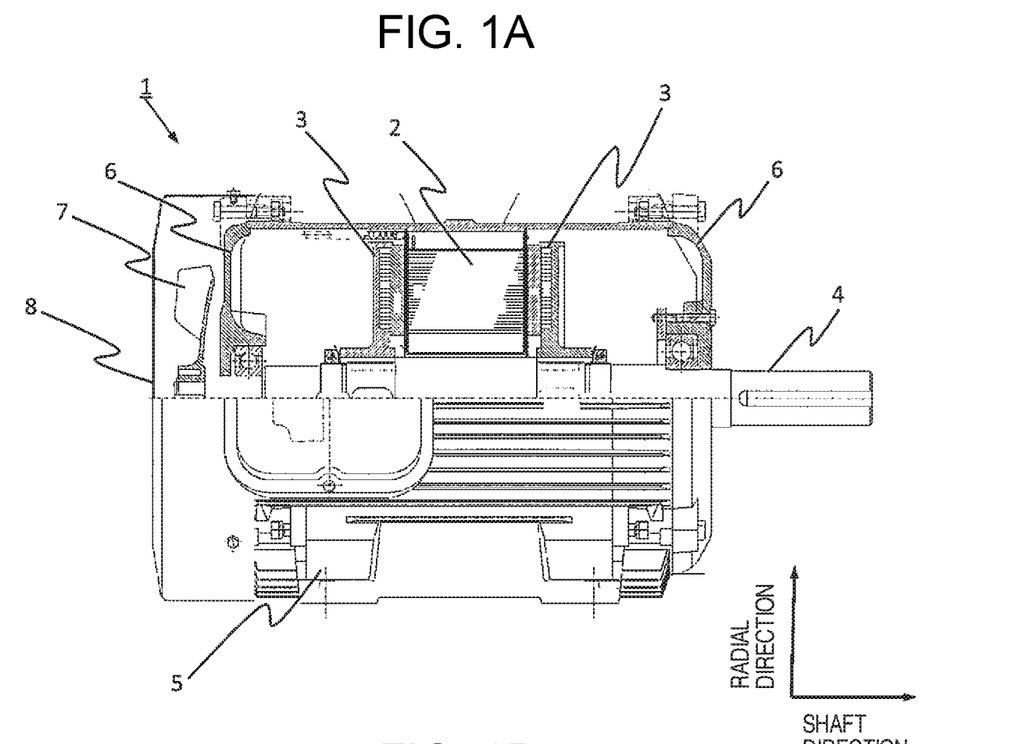
FIGS. 1A and 1B are longitudinal sectional views schematically illustrating a configuration of an entire axial gap electric motor and an armature according to a first embodiment of the present invention.
Figure 1B:
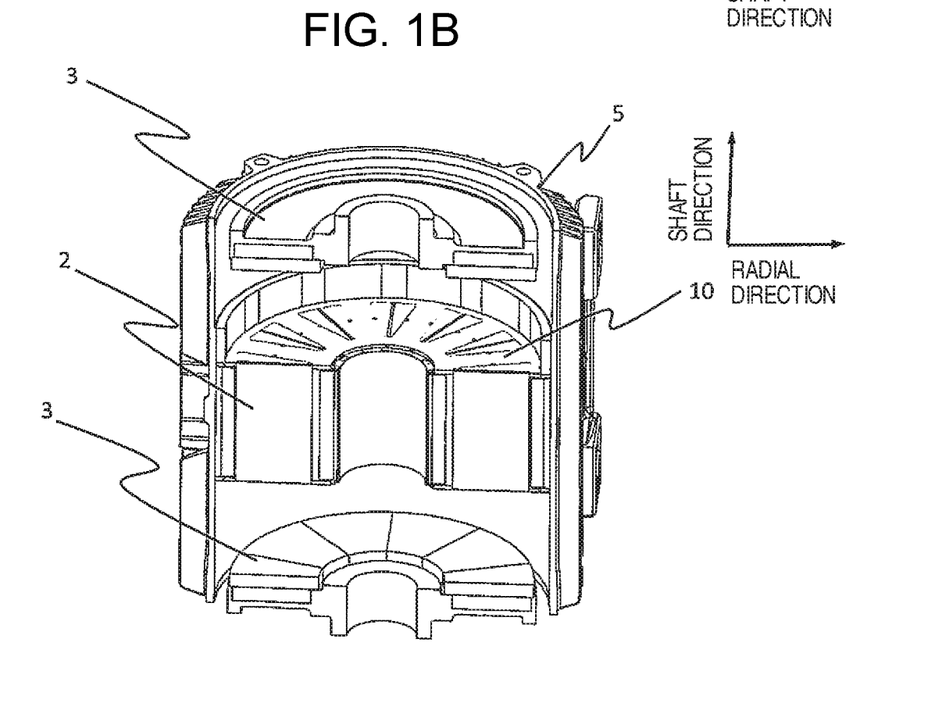

In FIG. 1, a configuration of an axial gap type electric motor 1 (hereinafter, simply referred to as the "electric motor 1") according to a first embodiment of the present invention is illustrated. Note, however, that the present invention is also applicable to a generator although the electric motor is exemplified in this embodiment. FIG. 1(a) illustrates a partial longitudinal section in a shaft direction, and FIG. 1(b) illustrates a perspective view schematically illustrating a longitudinal section in the shaft direction of a configuration of an armature. In FIG. 1(a), the electric motor 1 includes, in a substantially cylindrical housing 5: a stator 2; two rotors 3 disposed interposing the stator 2 from both sides in the shaft direction; a rotating shaft 4 disposed so as to penetrate through a shaft penetration region at the center of the stator 2 and so as to rotate with each of the rotors 3; an end bracket 6 each on an output side and on a counter-output side connected to the rotating shaft 4 through a bearing; a cooling fan 7 connected to an end portion of the rotating shaft 4 penetrating through the end bracket 6 on the counter-output shaft side and rotating therewith; and a fan cover 8 that deflects and guides cooling air generated by the cooling fan 7 toward a plurality of cooling fins extending in the shaft direction on an outer periphery side of the housing 5.

As illustrated in FIG. 1(b), the stator 2 has a circular shape around a rotating shaft center and has a magnetic flux end surface in a rotating shaft direction. Each of the rotors 3 has a magnet surface facing each of the magnetic flux end surfaces of the stator 2 and is disposed one each on the output shaft side and the counter-output shaft side. The electric motor 1 has a two-rotor one-stator type armature configuration in which the stator 2 and the rotors 3 have flux surfaces that are facing interposing a predetermined gap. Note, however, that the present invention is not to be limited thereto and may be applied to various configurations such as a one-stator one-rotor type configuration, a two-stator one-rotor type configuration, and a configuration constituted of a plurality of stators and a plurality of rotors.

The stator 2 has a plurality (12 in this example) of core members 9 circularly disposed around a shaft center direction. Further, the stator 2 has a mold resin 10 that integrally covers a gap in a rotation direction of the adjacent core members 9, an outer periphery side in a radial direction, an inner periphery on a shaft center side (shaft penetration region side), and a part or a whole of both end surfaces in the shaft direction. The mold resin 10 is molded, in a resin molding die, by enclosing a resin in a plurality of core members 6 that is circularly arranged, and the like. In this embodiment, the housing 5 is used as a part of the resin-molding mold, and the stator 2 is fixed in the housing 5 by the mold resin 10. Further, the mold resin 10 contributes to securing arrangement strength and insulation properties of each of the core members 9.

Note that it is also possible to dispose the stator 2 that is resin-molded separately in the housing 5 and fixed it with a bolt and the like. Furthermore, it is also possible not to use the mold resin, and the plurality of core members 6 may be fixed with a connecting plate or a ring member of metal and the like and may be fixed to the housing 5 subsequently with a bolt and the like.

Figure 2A:
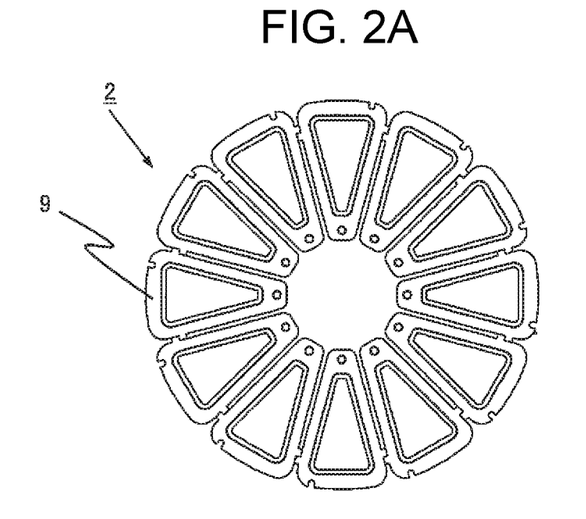
FIGS. 2A to 2C are schematic views illustrating a configuration of a stator, a core member, and a bobbin according to the first embodiment.

FIG. 2 schematically illustrates a configuration of the stator 2. FIG. 2(a) illustrates a front view in the shaft direction of the stator 2 (mold resin 10 is omitted in the illustration). The plurality of core members 9 is circularly disposed by facing an upper base of a core 11 having a substantially trapezoidal sectional shape toward a rotating shaft side.

Figure 2B:
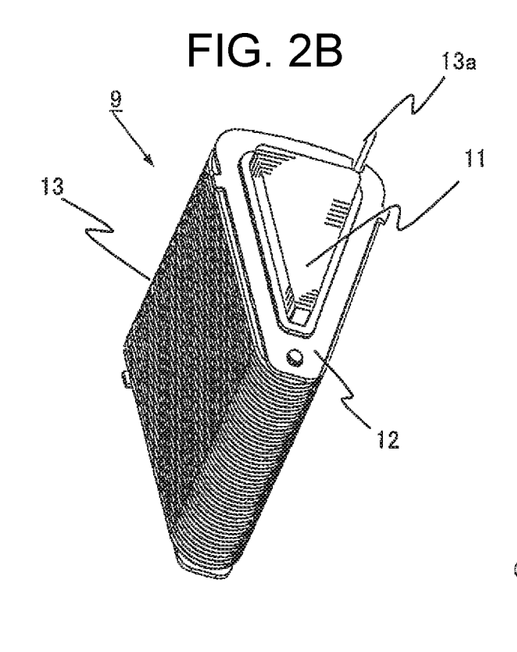

FIG. 2(b) illustrates a perspective view of the core member 9. The core member 9 includes the core 11, a bobbin 12, and a coil 13. The core 11, which is a laminated body made of a foil body and a thin metal plate member, is disposed (inserted) in an inner tube of the tubular bobbin 12, and the coil 13 is disposed to (wound around) an outer tube of the bobbin 12. A winding start or a leader line of the coil 13 is denoted by the reference numeral 13a.

Figure 2C:
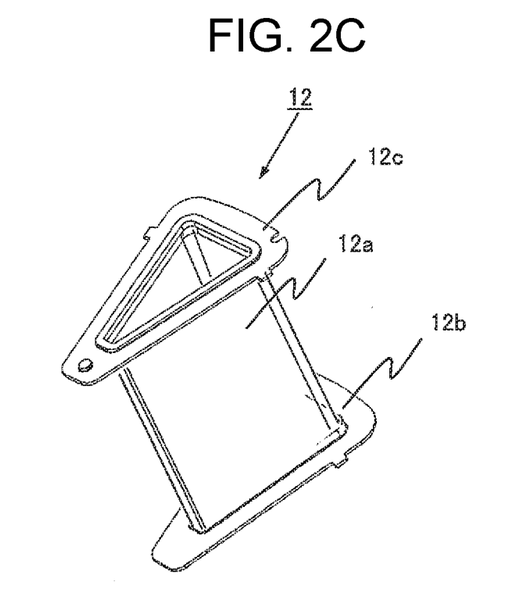

FIG. 2(c) illustrates a perspective view of the bobbin 12. The bobbin 12 has a tubular shape made of an insulating polymer such as resin. The bobbin 12 has a tubular portion 12a having an inner diameter substantially the same as an outer diameter of the core 11, and flanges 12b and 12c extending for a predetermined width in an entire periphery in the radial direction of the bobbin 12 from the vicinity of edges of both openings of the tubular portion 12a along a shape of the openings. An outer periphery in the radial direction of the core 11 is in contact with an inner tube surface 12e of the tubular portion 12a.

FIG. 3 schematically illustrates a configuration of the core 11. FIG. 3(a) is a perspective view of the core 11. The core 11 has a columnar shape and has a lamination section that is a substantially trapezoidal shape. FIG. 3(b) is a front view in the shaft direction schematically illustrating an exemplary lamination configuration of the core 11. The core 11 is constituted of an amorphous (uncrystallized) magnetic foil body or a thin plate (for example, about 0.2 mm in thickness) laminated as a lamination plate member. More specifically, the core 11 is constituted of a foil body 11a having a fixed length in the shaft direction and having a width in the rotation direction that gradually increases by one sheet or by a predetermined number of sheets from the shaft center side toward an outer side in the radial direction, and the foil body 11a is laminated in the radial direction of the core 11. In laminating, there is a method of laminating, for example, using a lamination mold having a substantially V shape along an outer peripheral shape of an upper base and oblique sides of the core 11, from a foil body having a smaller width.

In this embodiment, the amorphous foil body is applied; however, the present invention is not to be limited thereto, and the effect is also expected by applying a laminated core in which a thicker steel plate (for example, 1.0 to 3.0 mm or thicker) is laminated.

In this embodiment, an end surface in the shaft direction (a top face and a bottom face) of the core 11 is a vertical section in the shaft center direction; however, the present invention is not to be limited thereto. It is also applicable to a configuration in which an shaft center side or an outer periphery side of the section is an inclined section protruding or recessed toward a side of the facing rotors 3, and a magnet surface of the facing rotors 3 is also an inclined section corresponding thereto, whereby constituting a gap that is inclined in the radial direction of the shaft.

Figure 3A:
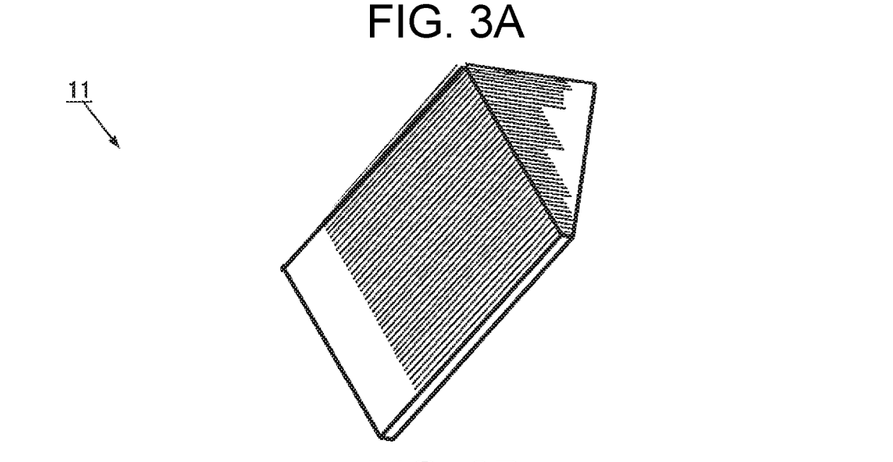
FIGS. 3A to 3D are schematic views illustrating a configuration of a core according to the first embodiment.
Figure 3B:
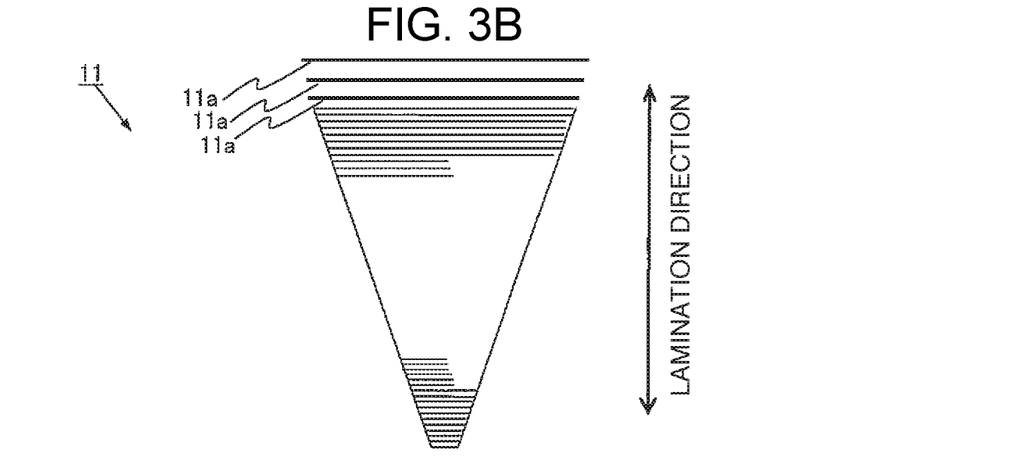
Figure 3C:
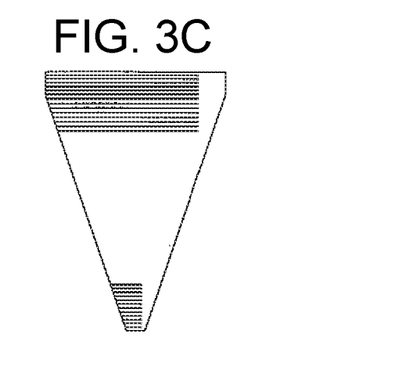
Figure 3D:
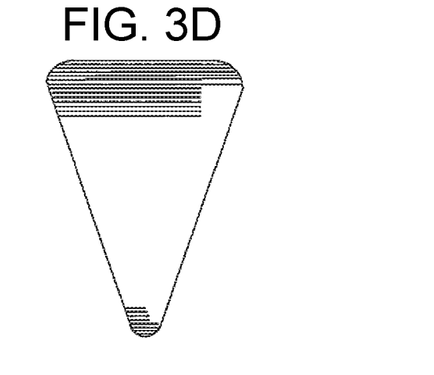

Further, in this embodiment, an exemplary configuration in which a sectional shape of the core 11 is a substantially trapezoidal shape is described; however, as illustrated in FIG. 3(c), it may also be a configuration in which a part where the width of the foil body is the same is applied only to the outer periphery side in the radial direction (lower base side) (e.g., a home base type), or as illustrated in FIG. 3(d), it may also be a configuration in which a rate of changing the width of the foil body is changed at least only in the vicinity of either the shaft center side (upper base side) or the outer periphery side (lower base side) so as to remove an edge at a corner portion (chamfered). Furthermore, the section may also be a fan shape, a round shape, or another rectangular shape.

Next, the bobbin 12 characterizing this embodiment is described. In a configuration in which the core 11, which is constituted of the laminated body, is inserted and disposed in the bobbin 12, it is preferred that a gap between the inner tube of the bobbin 12 and the core 11 be smaller. This is to secure an advantage of performance of securing a space factor as well as an advantage of retention and reliability by pressing an outer periphery of the core 11 with the inner tube. For this reason, such advantages can be obtained by making an inner diameter of the tubular portion 12a and an outer diameter of the core 11 close to the same diameter as possible; however, in inserting the core 11, which is constituted of the foil body or the thin plate, into the bobbin 12, there is a possibility that the foil body or the thin plate may cause buckling or turn-up due to friction with a wall surface of the inner tube. Furthermore, the foil body or the thin plate does not always have a uniform thickness, and a difference in the thickness may cause a lamination thickness deviation in the laminated body in some cases. Such deviation may be caused in part of the core 11, whereby there may be a problem remained in the workability and the productivity.

Therefore, this embodiment is characterized in that the tubular portion 12a of the bobbin 12 has a tapered shape in which an inner diameter thereof gradually becomes smaller from one opening A (indicated by a solid line) of the tubular portion 12a toward the other opening B (indicated by a dotted line) of the tubular portion 12a.

Figure 4A:
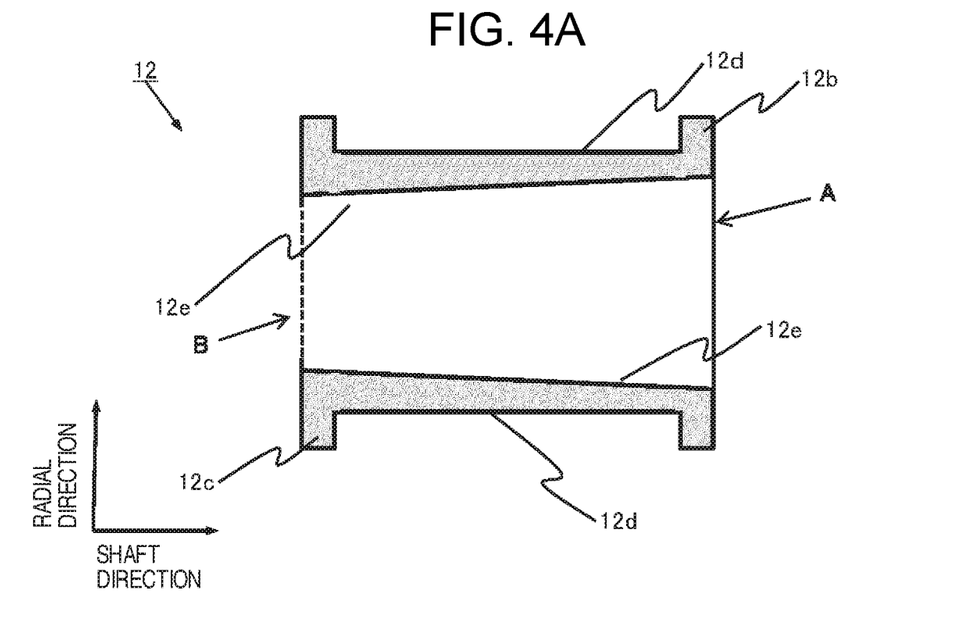
FIGS. 4A and 4B are schematic views illustrating a configuration of the bobbin according to the first embodiment.

FIG. 4(a) schematically illustrates a longitudinal sectional view in the shaft direction of the bobbin 12. While outer tube surfaces 12d of the tubular portion 12a are in parallel, the inner tube surface 12e has a sectional diameter that gradually becomes smaller from one opening A toward the other opening B (dotted line). More specifically, an area of the opening is different between the opening A and the opening B, and the inner tube surface 12e starting therefrom or ending thereat becomes a linear taper.

Figure 4B:
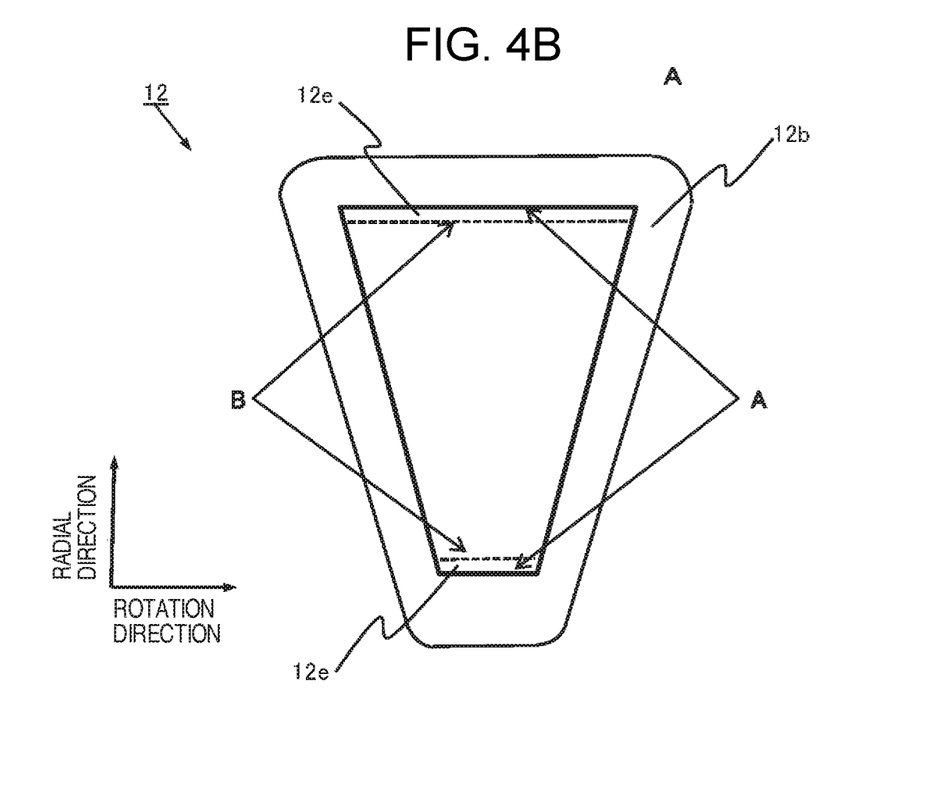

FIG. 4(b) schematically illustrate the bobbin 12 viewed from one opening A in the shaft direction. As illustrated in the drawing, this embodiment is characterized in that two inner tube surfaces 12e (an upper base surface and an lower base surface) opposed in a lamination direction of the core 11 (radial direction in the drawing) among the inner tube surfaces 12e has a tapered shape, and similar to the outer tube surfaces 12d, the inner tube surfaces 12e (oblique sides surface) in the rotation direction are in parallel. For example, considering the lamination thickness deviation of the core 11 described above, forming the facing surfaces in the lamination direction (the upper base surface and the lower base surface) of the inner tube surfaces 12e into a tapered shape may contribute to improving workability and productivity in terms of the buckling or the turn-up due to insertion as well as to retaining the core 11 within the bobbin.

Figure 5A:
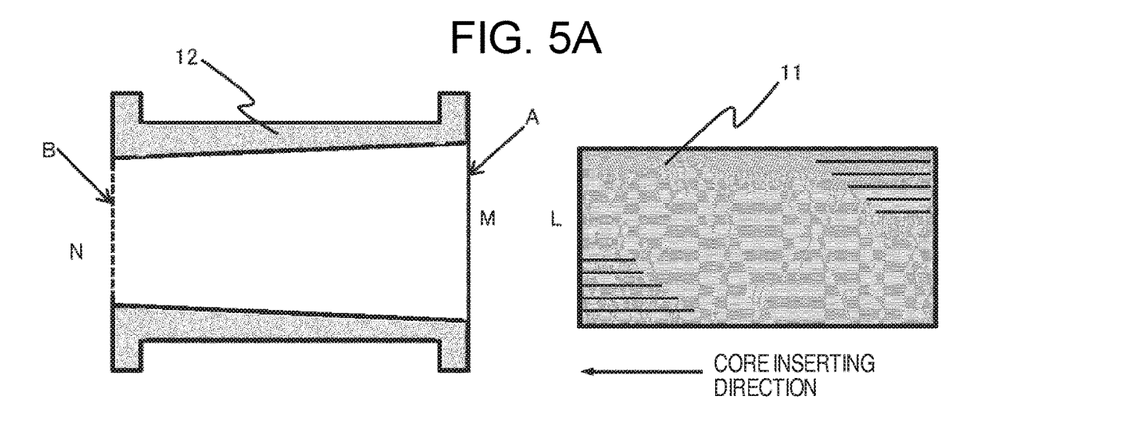
FIGS. 5A to 5C are schematic views illustrating various aspects of inserting the core into the bobbin according to the first embodiment.
Figure 5B:
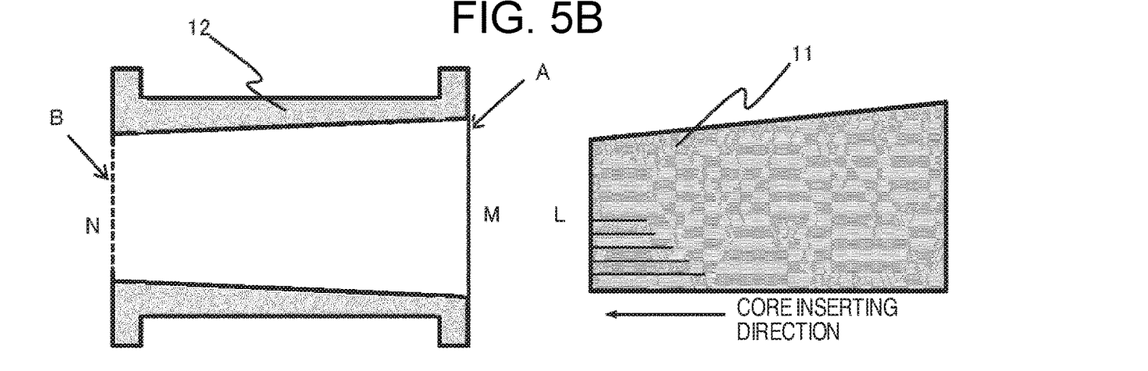
Figure 5C:
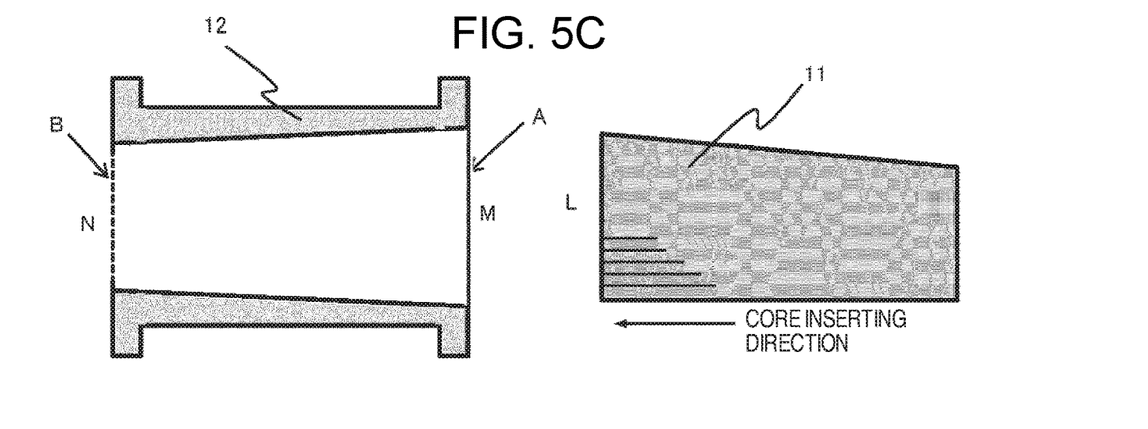

FIG. 5 illustrates a state in which the core 11 is inserted into the bobbin 12. FIG. 5(a) illustrates a case where there is no deviation in thickness in the shaft direction of the core 11, and FIGS. 5(b) and 5(c) illustrate a case where there is a deviation therein in the shaft direction. Here, the number of sheets to be laminated of the core 11 is constant, and a reference value (theoretical value) of thickness in the lamination direction is L, and a tolerance (lamination thickness deviation) is ±x. Further, it is assumed that a width M in the radial direction of the rotating shaft of the opening A is in a relationship of M≥L+x. It is assumed that a width N in the radial direction of the rotating shaft of the opening B is in a relationship of N≤L−x or N=L.

In the case of FIG. 5(a), since the width M in the radial direction of the opening A is larger than the thickness L on an insertion side of the core 11, it does not come into contact with the inner tube surfaces 12e in the vicinity of the opening A at the time of insertion. Then, as it moves toward the opening B, the tapered inner tube surfaces 12e gradually press the core 11 against the lamination direction, and in the vicinity of the opening B, the inner tube surface 12e surely press and retain the core 11. Then, until about one-half to one-third of the core 11 is inserted into the inner tube, since strong friction is unlikely to be caused between the inner tube surface 12 and the core 11, occurrence of the buckling, the turn-up, and the like of the foil body or the like is suppressed.

In the case of FIG. 5(b), the thickness of the core 11 on an inserting direction side is L−x, and the thickness thereof on an opposite side of the inserting direction is L+x. In this case, until about three-fourth of the inner tube is inserted from the opening A, active friction is unlikely to be caused between the core 11 and the inner tube surfaces 12e, whereby the workability and the productivity are improved. Then, once up to the vicinity of the opening B is inserted, pressing force is gradually generated in the lamination direction of the core 11, whereby retention of the core 11 is secured. The inner tube becomes closer to a shape corresponding to the lamination thickness deviation of the core 11, whereby an improvement of the workability and the productivity as well as an improvement of core retention are both achieved.

In the case of FIG. 5(c), the thickness of the core 11 on the inserting direction side is L, and the thickness thereof on the opposite side of the inserting direction is L−x. The width M in the radial direction of the opening A is larger than the maximum lamination thickness L of the core 11, and the minimum lamination thickness L−x of the core 11 is equal to the width N in the radial direction of the opening B. In this case, although there is substantially no possibility of the buckling or the turn-up at the time of insertion, in order to further secure retaining force of the core, it is inserted from the maximum lamination thickness L side. The active friction is unlikely to be caused against the inner tube surfaces 12e from the vicinity of the opening A to about one third thereof, and by further moving toward the opening B, the retaining force of the core can be secured.

According to the first embodiment, at the time of insertion, the insertion side of the core 11 is determined according to the lamination thickness deviation of the core 11, and by selecting from (a) to (c) described above, it is possible to improve the workability and the productivity as well as to secure the retaining force of the core in the bobbin.

Further, the first embodiment is an aspect in which the mold resin is disposed in the stator 2; however, since a gap is unlikely to be formed between the inner tube of the bobbin 12 and the core 11, it is possible to prevent resin from entering between the inner tube of the bobbin 12 and the core 11 due to high sealing pressure a during resin-molding.

The first embodiment has been described as above; however, the present invention is not to be limited by various examples described above. In particular, the relationship between the widths in the radial direction of the openings A and B as well as the lamination thickness deviation and the tolerance of the core 11 are examples, and various aspects are possible within the scope not deviating from the gist thereof.

Although the linear taper is exemplified as the taper of the bobbin 12, it may also be a curved taper in a parabolic or exponential manner.

Further, the core 11 is described to have the certain number of sheets to be laminated of the foil body or the like; however, it may also be a configuration in which the reference value of the lamination thickness is prioritized, for example.

Furthermore, there has been described a case in which the direction of laminating the foil body or the like in the core 11 is the radial direction; however, in a case where it is laminated in the rotation direction, by making surfaces facing in the rotation direction (surfaces to be oblique sides surface of a trapezoidal pillar) of the inner tube of the tubular portion 12a into a tapered shape, the same effect can be obtained.

Second Embodiment

A second embodiment is mainly different from the first embodiment in that, among inner peripheral surfaces 12e of a bobbin 12, only one surface on either the shaft center side or the outer periphery side in the lamination direction of the core has a tapered shape. The second embodiment is described below. Note, however, that the same reference numerals are used for members and elements that are the same as those in the first embodiment, and a detailed description thereof may be omitted.

Figure 6A:
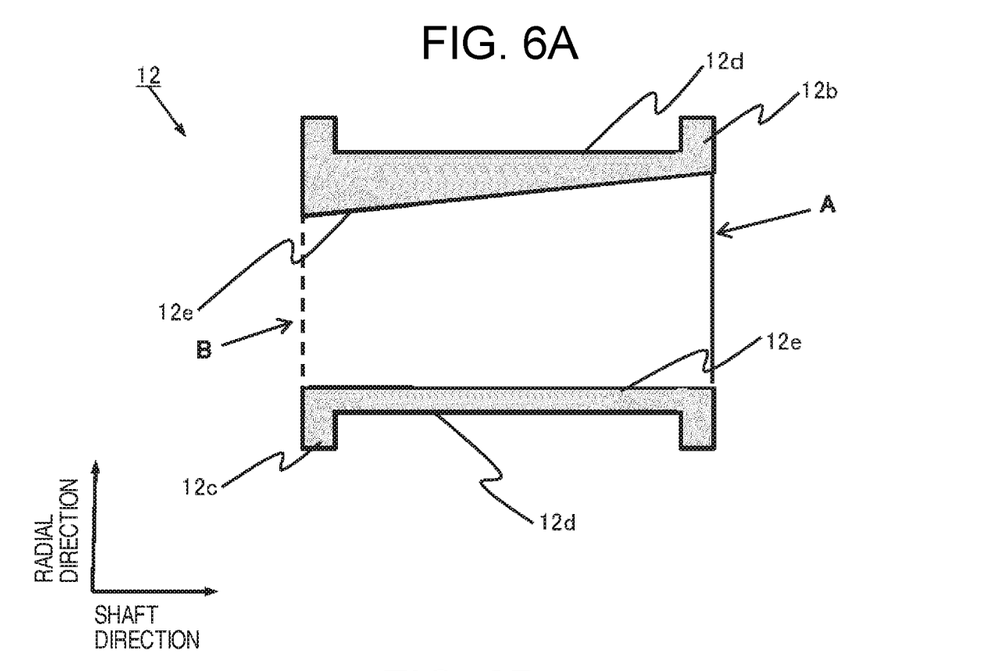
FIGS. 6A and 6B are schematic views illustrating a configuration of a bobbin according to a second embodiment of the present invention.
Figure 6B:
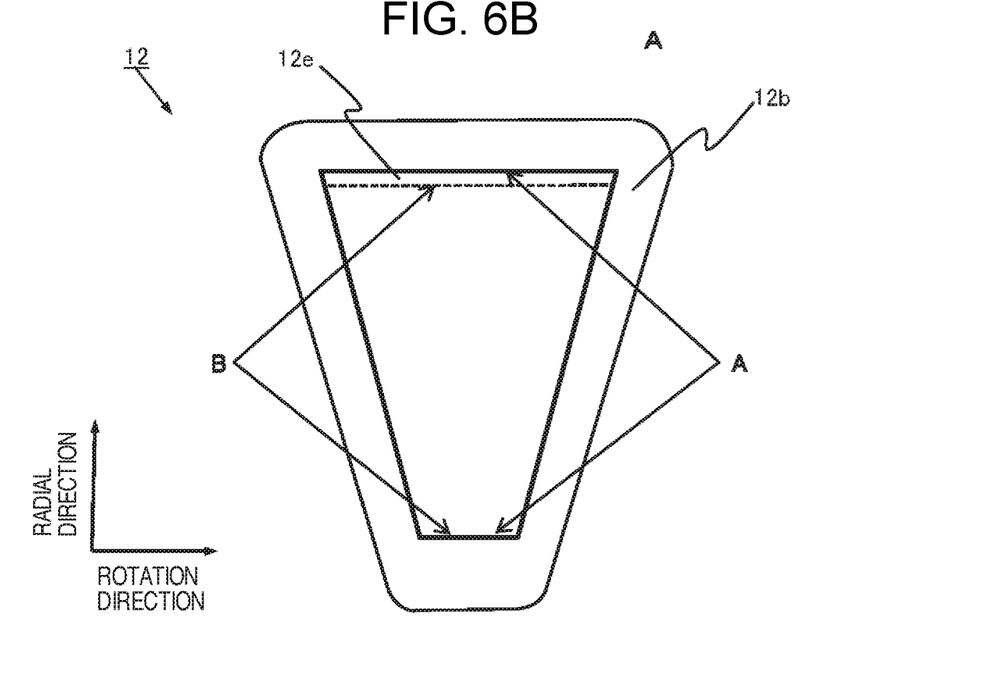

FIG. 6 schematically illustrates a longitudinal section in the shaft direction and a front view in the shaft direction of the bobbin 12 according to the second embodiment. The bobbin 12 is configured such that only a surface on the outer periphery side (lower base side) of the inner tube surface 12e has the tapered shape, and an inner diameter thereof gradually becomes small from the opening A toward the opening B. More specifically, only the surface on the outer periphery side facing in the lamination direction of the core 11 of the inner tube surface 12e has the tapered shape. The other surfaces of the inner tube surfaces 12e are in parallel to the outer tube surfaces 12d in parallel to the shaft direction.

In the case of the second embodiment, the inner tube surface 12e on the outer periphery side in the lamination direction that has a large width in the rotation direction is tapered. Therefore, there is an advantage that the foil body or the like is uniformly pressed against the rotating shaft center direction of the core 11. In other words, the foil body or the like having the large width in the rotation direction can press an entire foil body or the like having a small width in the rotation direction on the shaft center side, whereby unevenness of the pressing force is reduced. In particular, in the configuration in which the stator 2 is covered with the mold resin as in this embodiment, the gap between the bobbin 12 and the core 11 is surely reduced by the sealing pressure of the resin, and entering of the resin is prevented, whereby it is advantageous from aspects of the performance and the reliability as well.

In this embodiment, the inner tube surface 12e on the outer periphery side is tapered; however, it does not exclude a configuration in which only the inner tube surface 12e on the rotation shaft center side is tapered. It can be said that as the width in the rotation direction is small, the workability and the productivity are improved from an aspect of frictional force.

Third Embodiment

A third embodiment is mainly different from the first and second embodiments in that the inner peripheral surface 12e of the bobbin 12 has a tapered shape from the middle in the shaft direction toward the opening B (or the opening A). The third embodiment is described below. Note, however, that the same reference numerals are used for members and elements that are the same as those in the first and second embodiments, and a detailed description may be omitted.

Figure 7A:
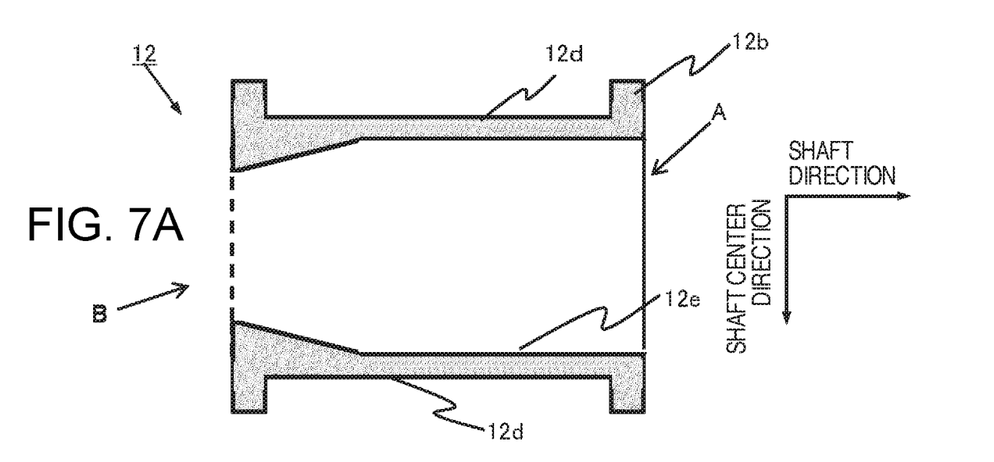
FIGS. 7A to 7C are schematic views illustrating a configuration of a bobbin according to a third embodiment according to the present invention.
Figure 7B:
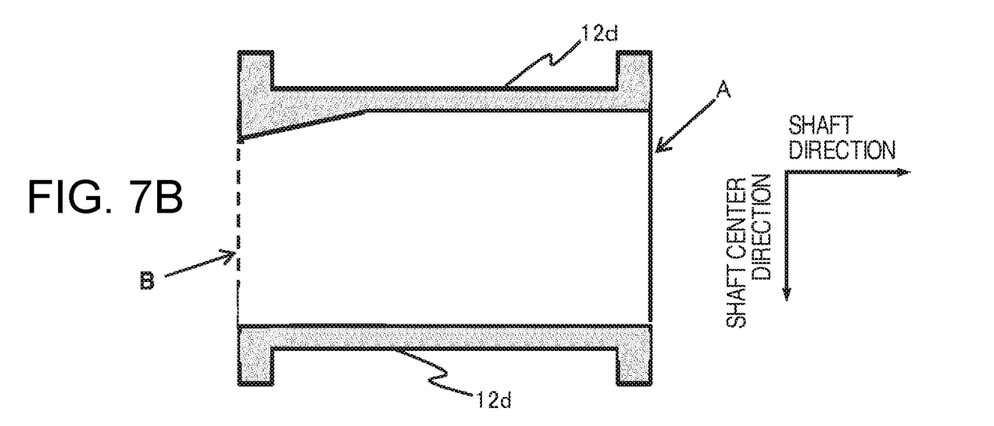

FIG. 7 schematically illustrates a longitudinal section in the shaft direction and a front view in the shaft direction of the bobbin 12 according to the third embodiment. FIG. 3(A) is an example in which the inner tube surface 12e is tapered on surfaces on the rotating shaft side and the outer periphery side facing the lamination direction of the foil body or the like from the middle in the shaft direction toward the opening B. FIG. 7(b) is an example in which the inner tube surface 12e is tapered on the surface on the outer periphery side from the middle in the shaft direction toward the opening B. Using such configurations, it is possible to expect an effect of improving the workability and the productivity as well as the core retention. Note that the taper in FIG. 7(b) may also be on the inner peripheral surface on the rotating shaft side.

Figure 7C:
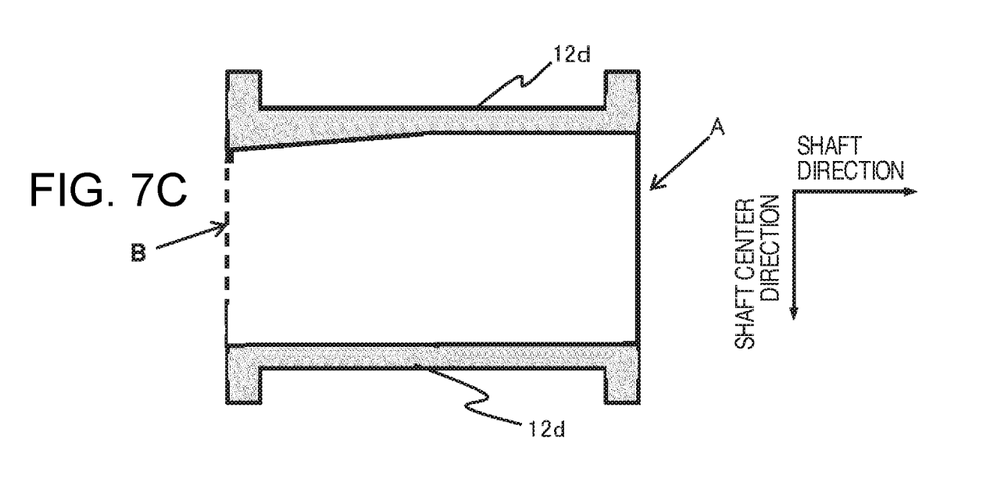

FIG. 7(c) is an exemplary configuration in which the inner peripheral surface 12e is tapered on the surface on the outer periphery side from the vicinity of the middle in the shaft direction toward the opening B. Note that it is also possible to taper only the surface on the rotating shaft side of the inner peripheral surface 12e or to taper both of the surfaces thereof.

Fourth Embodiment

A fourth embodiment is mainly different from the first to third embodiments in that a direction of inserting the core 11 into the bobbin 12 is different. A primary object of the first to third embodiments is to secure the workability, the productivity, and the core retention relative to the lamination thickness deviation of the core 11 being the laminated body; however, a primary object of the fourth embodiment is to change the space factor of the core.

The space factor (density of a magnetic material) of the core acts on strength of magnetic flux. For example, in general, in a case where the space factor (magnetic material density) is low, the magnetic flux tends to be weaker than in the case where it is high. In other words, in the core constituted of the laminated body of the foil body or the plate member, it is also possible to strengthen or weaken the magnetic flux by adjusting the thickness in the lamination direction. The space factor of the core alone is not necessarily constant, and it is not unusual to use a different space factor depending on requirements and the like of an application device to be a load.

In the axial gap rotating electric machine, it is also possible to make the space factor different between the output side and the counter-output side of the core 11 so as to correspond to various specifications. Such change in the space factor can also be achieved by changing a lamination state of the foil body or the plate member to be laminated. That is, merely stacking the foil bodies or the like may result in forming a fine space therebetween due to a twist, deflection, and the like. Furthermore, it is also possible to consider changing the thickness of the core by using strength and elasticity of the laminated member such as the foil body itself. By decreasing the fine space using the pressing force from the lamination direction or by compressing the laminated body itself, it is possible to change the space factor of the core.

The fourth embodiment is characterized in that the tapered shape of the inner tube surface 12e of the bobbin 12 is utilized to adjust the space factor of the core.

Figure 8A:
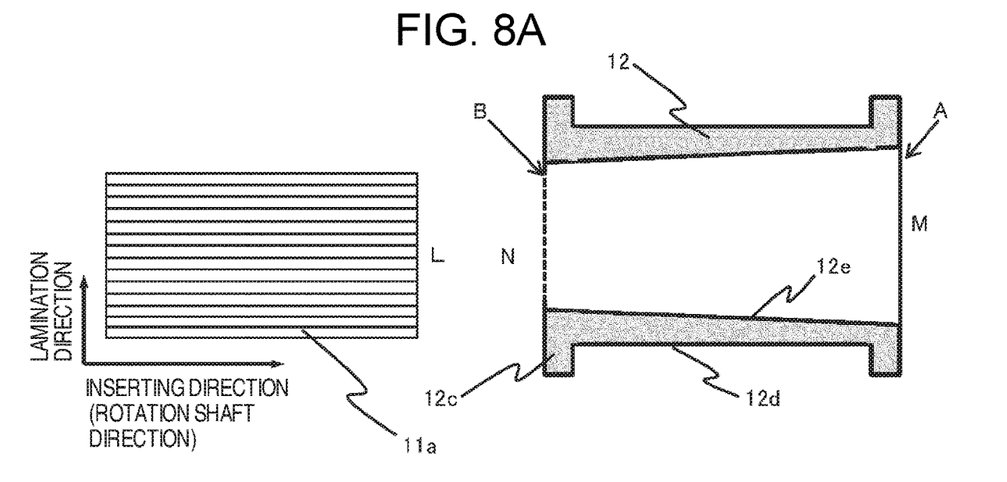
FIGS. 8A and 8B are schematic views illustrating a configuration of a bobbin and a core according to a fourth embodiment of the present invention.

FIG. 8(a) schematically illustrates a longitudinal sectional view in the shaft direction of the bobbin 12 and the core 11 (to make it simpler, the foil body 11a is indicated thicker in the drawing). Similar to the first embodiment, the bobbin 12 has the tapered shape on the surface on the rotating shaft side and the surface on the outer periphery side facing the lamination direction the inner peripheral surface 12e from the opening A toward the opening B. The lamination thickness L of the core 11 has no deviation in the shaft direction in a laminating step, and it is equal to or smaller than the width M in the radial direction of the opening A and is larger than the width N in the radial direction of the opening B. The core 11 is inserted from the opening B toward the opening A. The thickness L is larger than the width N of the opening B; however, it is pressed in the lamination direction using a jig and the like such that L is equal to or smaller than N at the time of insertion.

Figure 8B:
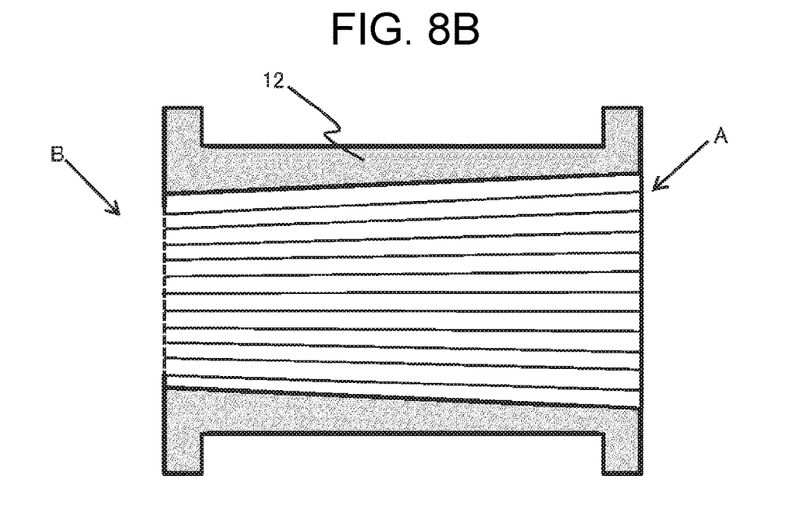

FIG. 8(b) schematically illustrates a state after the insertion of the core 11. On an opening B side of the core 11, the space factor is large due to a taper while on an opening A side, the space factor becomes relatively small as the core slightly swells in the lamination direction along the taper expanding in the radial direction from the opening B. As a result, the core 11 has the space factor that gradually increases or decreases in the shaft direction.

Regarding an adjustment of the thickness, as in the first to third embodiments, an effect can be expected in a case where the core 11 is inserted from the opening A side; however, as in the fourth embodiment, in a case where the core 11 is inserted from the opening B side, since a part of the bobbin 12 where the space factor becomes large is close to the pressing jig, it is possible to insert and dispose the bobbin 12 without applying excessive force thereto.

Figure 9A:
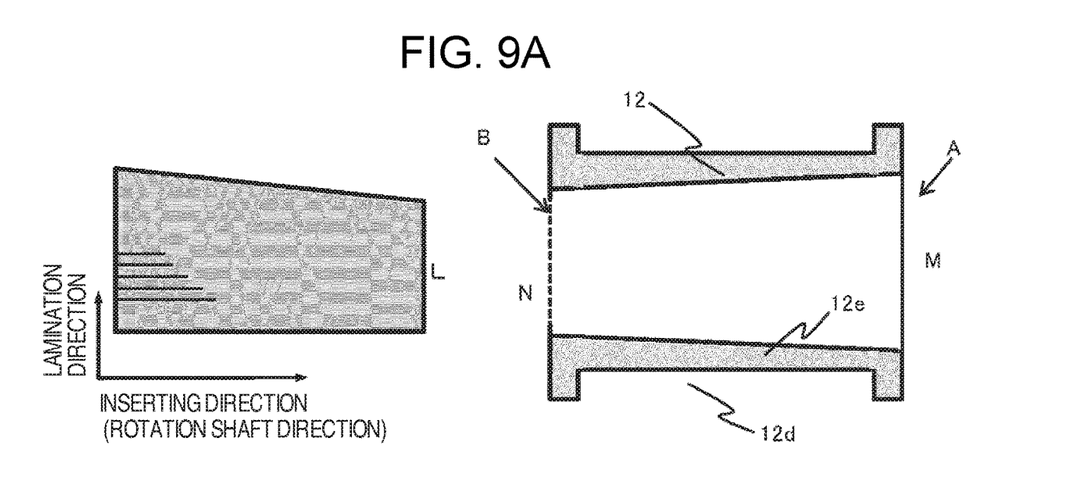
FIGS. 9A and 9B are schematic views illustrating the bobbin and aspects of inserting the core according to the fourth embodiment.
Figure 9B:
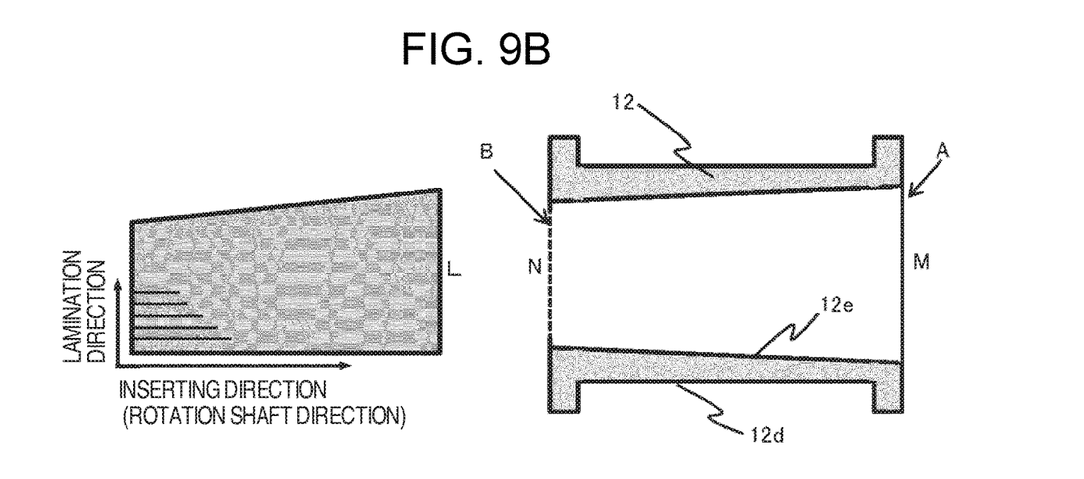

FIG. 9 schematically illustrates a case where the core 11 has the lamination thickness deviation in the shaft direction. FIG. 9(a) illustrates a case where the lamination thickness L on the insertion side of the core 11 is small, and the core is inserted from the opening B. FIG. 9(b) illustrates a case where the lamination thickness L on the insertion side of the core 11 is large, and the core is inserted from the opening B. In a case where the core 11 has the lamination thickness deviation in the shaft direction, it is possible to deal with various changes in the space factor by planning a change in the space factor in the shaft direction and by selecting the inserting direction of the core 11.

Note that the taper may not necessarily be on two facing surfaces in the lamination direction of the inner tube surfaces 12e, and it may be only on one of the surfaces as illustrated in the second embodiment, or it may be from any intermediate part in the shaft direction of the inner tube surfaces 12e as illustrated in the third embodiment.

[Manufacturing Method]

Finally, a method for manufacturing the bobbin 11 is described. The bobbin 11 according to the first to fourth embodiments is formed of an insulating polymeric body such as resin and is manufactured by resin-molding. However, the present invention is not to be limited thereto, and it is also possible to manufacture the bobbin using a three-dimensional modeling machine and the like described below. That is, not only the bobbin itself may be manufactured using the three-dimensional modeling machine but also a mold for the resin-molding may be obtained by laminating and molding using the three-dimensional modeling machine or by cutting using a cutting RP machine.

In the laminating and molding, it is possible to apply a photo fabrication method, a powder sintering lamination molding method, an ink jet method, a resin melting lamination method, a gypsum powder method, a sheet molding method, a film transfer image lamination method, a metal photo-fabrication combined processing method, and the like may be applied.

Data for the above laminating and molding as well as cutting is generated by processing 3D data, which is generated by CAD and CG software or by a 3D scanner, into NC data using CAM. Three-dimensional molding is performed by inputting the data into the three-dimensional modeling machine or the cutting RP machine. It is also possible to generate the NC data directly from the 3D data using the CAD/CAM software.

Further, as a method for obtaining the bobbin 11 as well as the mold for resin injection molding, it is also possible to manufacture the bobbin 7 by allowing the 3D data or the NC data to be distributable in a predetermined file format through a communication line such as the Internet by a data provider or a service provider who has created the data, and by allowing a user to download the data on a 3D modeling machine or a computer and the like for controlling the 3D modeling machine or to access the data as a cloud service, and by molding and outputting using the three-dimensional modeling machine. Note that it is also possible to use a method in which the data provider records the 3D data and the NC data on a nonvolatile recording medium and provides it to the user.

One aspect of the bobbin 11 according to such manufacturing method is as follows. A method for manufacturing a rotating electric machine stator bobbin including an inner tube facing an outer periphery in a radial direction of a core that is constituted by laminating a laminated member of a magnetic material and has a columnar shape in which top and bottom surfaces are sections in a lamination direction, the method including manufacturing by using a three-dimensional modeling machine based on three-dimensional data in which at least part of an inner tube gradually becomes smaller along the rotating shaft direction to have an inner diameter coming into contact with the outer periphery surface in the radial direction of the laminated core.

Another aspect is a method for manufacturing a rotating electric machine stator bobbin including an inner tube facing an outer periphery in a radial direction of a core that is constituted by laminating a laminated member of a magnetic material and has a columnar shape in which top and bottom surfaces are sections in a lamination direction, the method including manufacturing by using a three-dimensional modeling machine based on three-dimensional data in which a part of the inner tube of the bobbin facing the outer periphery in the radial direction of the core has a tapered shape along an extending direction.

Still another aspect is a method for manufacturing a rotating electric machine stator bobbin including an inner tube facing an outer periphery in a radial direction of a core that is constituted by laminating a laminated member of a magnetic material and has a columnar shape in which top and bottom surfaces are sections in a lamination direction, the method including communicating, through a communication line, data for a three-dimensional modeling machine in which at least part of an inner tube gradually becomes smaller along the rotating shaft direction to have an inner diameter coming into contact with the outer periphery surface in the radial direction of the laminated core.

Various examples for carrying out the present invention have been described; however, the present invention is not to be limited to the various configurations described above, and various modifications may be made within the scope not deviating from the gist thereof.

Figure 10A:
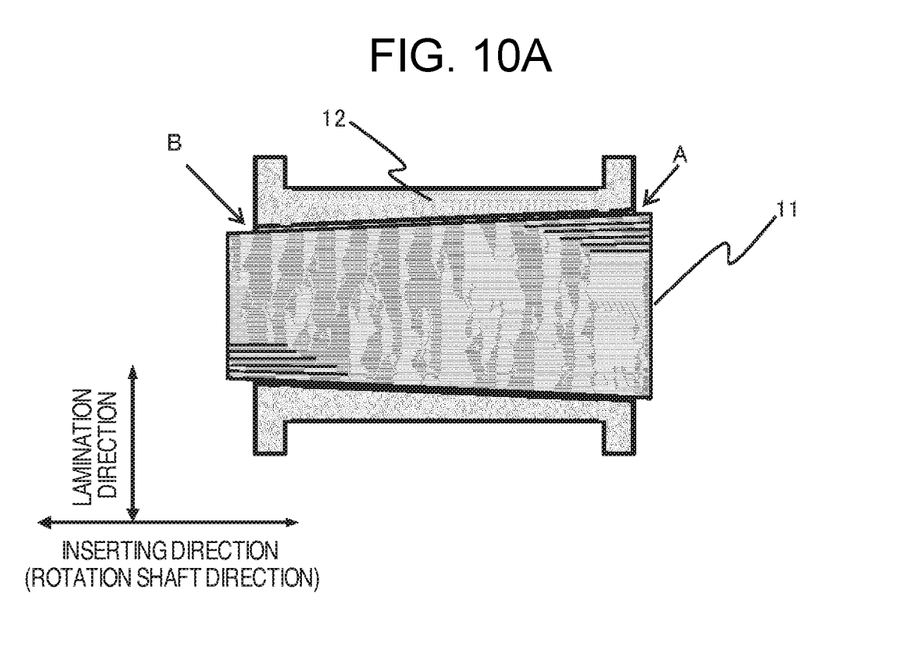
FIGS. 10A and 10B are schematic views illustrating the bobbin and aspects of inserting the core according to another embodiment.
Figure 10B:
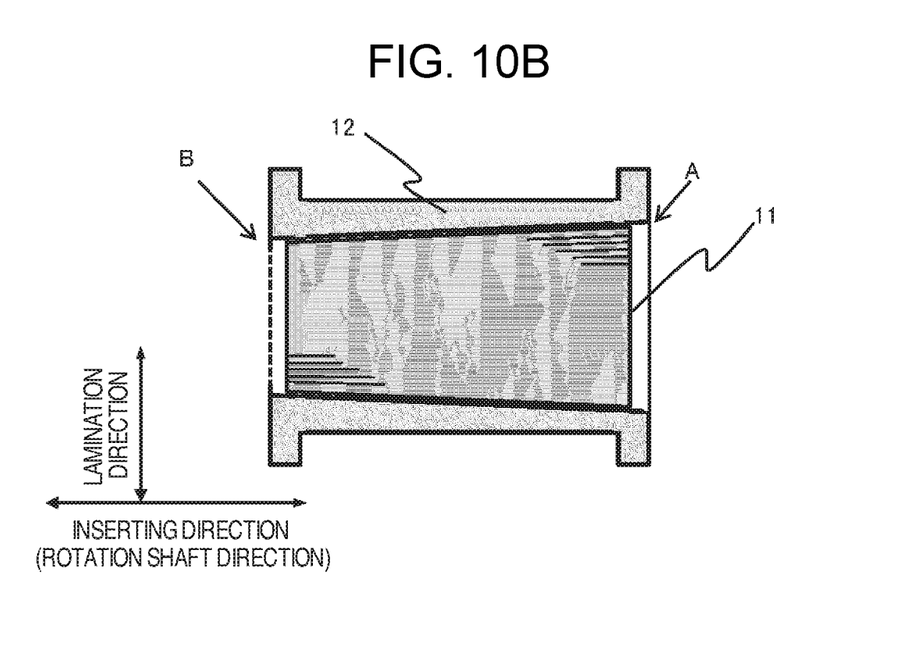

For example, the present invention is not limited to a configuration in which a length in the shaft direction of the inner peripheral surface 12e of the bobbin is the same as a length in the shaft direction of the core 11, and it is also applicable to a configuration in which either one is long or short. More specifically, this is a case where both ends in the shaft direction of the core 11 protrude from the bobbin 12 as illustrated in FIG. 10(a), and a case where the core 11 is contained in the inner peripheral surface 12e as illustrated in FIG. 10(b). Furthermore, it may also be a case where one of ends of the core 11 is in the same position as the openings A and B in the shaft direction and the other of the ends is protruded or contained.

Further, for example, the bobbin 11 is not necessarily limited to the case where it has openings at both ends in the shaft direction, and it is also applicable to a case where it has a cup shape in which only one of the ends is opened.

Further, in the inner peripheral surface 12e having the taper, it is not limited to a configuration having the taper over an entire width in a rotation direction and may also be a configuration having the taper in part in a width direction.

REFERENCE SIGNS LIST

1 Axial gap electric motor
2 Stator
3 Rotor
4 Rotating shaft
5 Housing
6 Bracket
7 Fan
8 Fan cover
9 Core member
10 Mold resin
11 Core
11a Foil body
12 Bobbin
12a Tube portion
12b, 12c Flange portion
12d Outer tube surface
12e Inner tube surface
13 Coil
13a Leader line, connecting wire
A, B Opening
L Lamination thickness
M Radial direction diameter of opening A
N Radial direction diameter of opening B

The invention claimed is:

1. An axial gap type rotating electric machine comprising:
a stator having a plurality of core members circularly disposed around a rotating shaft center, the plurality of core members including: a laminated core having a columnar shape having a flux surface in a rotating shaft direction; a coil disposed on an outer periphery in a radial direction of the core; and a bobbin having a substantially tubular shape and disposed between the core and the coil, and at least one rotor facing the flux surface interposing a predetermined gap in the rotating shaft direction, wherein
the bobbin includes an inner tube facing the outer periphery in the radial direction of the core, wherein at least part of an inner diameter of the inner tube gradually becomes smaller along the rotating shaft direction and comes in contact with an outer periphery surface in the radial direction of the laminated core, and
wherein a thickness of the laminated core on an opening side of the bobbin is different from a thickness of the laminated core on other opening side thereof.

2. The axial gap type rotating electric machine according to claim 1, wherein
at least part of the inner diameter gradually becomes smaller along the rotating shaft direction in a facing part in a lamination direction of the laminated core.

3. The axial gap type rotating electric machine according to claim 1, wherein
an opening diameter of one opening of the inner tube is different from an opening diameter of the other opening thereof, and the laminated core is disposed in the inner tube from the opening having the large opening diameter toward the opening having the small opening diameter.

4. The axial gap type rotating electric machine according to claim 1, wherein
an opening diameter of the inner tube is different from an opening diameter of the other opening thereof, and
the laminated core is disposed in the inner tube from the opening having the small opening diameter toward the opening having the large opening diameter.

5. The axial gap type rotating electric machine according to claim 1, wherein
the bobbin is made of an insulating polymer.

6. The axial gap type rotating electric machine according to claim 1, wherein
a laminated body constituting the laminated core is a foil body or a plate member of a magnetic material.

7. The axial gap type rotating electric machine according to claim 1, wherein
a section in a radial direction of the laminated core includes a part where a width in the rotation direction is larger on the outer periphery side than on the shaft center side.

8. An axial gap type rotating electric machine comprising:
a stator having a plurality of core members circularly disposed around a rotating shaft center, the plurality of core members including: a laminated core having a columnar shape having a flux surface in a rotating shaft direction; a coil disposed on an outer periphery in a radial direction of the core; and a bobbin having a substantially tubular shape disposed between the core and the coil, and
at least one rotor facing the flux surface through a predetermined gap in the rotating shaft direction, wherein
the bobbin
includes an inner tube facing the outer periphery in the radial direction of the core, and
a part of the inner tube has a tapered shape along the rotating shaft direction, and wherein a thickness of the laminated core on an opening side of the bobbin is different from a thickness of the laminated core on other opening side thereof.

9. The axial gap type rotating electric machine according to claim 8, wherein
the tapered shape is a facing part in a lamination direction of the laminated core.

10. The axial gap type rotating electric machine according to claim 8, wherein
an opening diameter of one opening of the inner tube is different from an opening diameter of the other opening thereof, and
the laminated core is disposed in the inner tube from the opening having the large opening diameter toward the opening having the small opening diameter.

11. The axial gap type rotating electric machine according to claim 8, wherein
an opening diameter of the inner tube is different from an opening diameter of the other opening thereof, and
the laminated core is disposed in the inner tube from the opening having the small opening diameter toward the opening having the large opening diameter.

12. The axial gap type rotating electric machine according to claim 8, wherein
the bobbin is made of an insulating polymer.

13. The axial gap type rotating electric machine according to claim 8, wherein
a laminated body constituting the laminated core is a foil body or a plate member of a magnetic material.

14. The axial gap type rotating electric machine according to claim 8, wherein
a section in a radial direction of the laminated core includes a part where a width in the rotation direction is larger on the outer periphery side than on the shaft center side.

\* \* \* \* \*